(12) United States Patent
Suselbeek et al.

(10) Patent No.: US 12,128,586 B2
(45) Date of Patent: Oct. 29, 2024

(54) METHOD OF MANUFACTURING A WIND TURBINE BLADE HAVING AN INCLINED ROOT END SURFACE

(71) Applicant: Vestas Wind Systems A/S, Aarhus N (DK)

(72) Inventors: Edgar Suselbeek, Meppel (NL); Bo Vermund Heinrich Jensen, Nakskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/766,856

(22) PCT Filed: Oct. 6, 2020

(86) PCT No.: PCT/EP2020/077914
§ 371 (c)(1),
(2) Date: Apr. 6, 2022

(87) PCT Pub. No.: WO2021/069399
PCT Pub. Date: Apr. 15, 2021

(65) Prior Publication Data
US 2024/0066760 A1    Feb. 29, 2024

(30) Foreign Application Priority Data

Oct. 7, 2019 (EP) .................... 19201697

(51) Int. Cl.
*B29C 33/14* (2006.01)
*B29C 70/54* (2006.01)
(Continued)

(52) U.S. Cl.
CPC ............ *B29C 33/14* (2013.01); *B29C 70/545* (2013.01); *F03D 1/0658* (2013.01); *B29L 2031/085* (2013.01); *F05B 2240/96* (2013.01)

(58) Field of Classification Search
CPC ....... B29C 33/14; B29C 33/12; B29C 70/545; B29C 70/86; F03D 1/0658; F03D 1/0675;
(Continued)

(56) References Cited

U.S. PATENT DOCUMENTS 8,347,501 B2 *   1/2013  Petersen ............ B29D 99/0025
                                                              29/466
9,074,581 B2 *   7/2015  Bagepalli .............. F03D 1/0658
(Continued)

FOREIGN PATENT DOCUMENTS

CN     102220936 A  *  10/2011
CN     103061995 A  *   4/2013
(Continued)

OTHER PUBLICATIONS

China National Intellectual Property Administration, first office action issued in corresponding CN Application No. 2020800830307, dated Jan. 15, 2024.
(Continued)

*Primary Examiner* — David E Sosnowski
*Assistant Examiner* — Wayne A Lambert
(74) *Attorney, Agent, or Firm* — Wood Herron & Evans LLP (57) ABSTRACT

In a first aspect of the invention there is provided a method of manufacturing a wind turbine blade. The method comprises providing a mould for a shell of the wind turbine blade, the mould extending in a longitudinal direction from a root end to a tip end; providing a plurality of elongated root inserts; providing a root plate with a plurality of arcuately arranged connection points; at the connection points, connecting the root inserts to the root plate, such that the connected root inserts jointly form a contour of a portion of a root section of the wind turbine blade; and positioning the root plate relative to the mould in order to place the contour (Continued)

formed by the root inserts at least partially into the mould. The method further comprises providing a spacer having a decreasing thickness, and the connecting of the root inserts to the root plate comprises providing the spacer between the root inserts and the root plate.

12 Claims, 6 Drawing Sheets (51) Int. Cl.
*F03D 1/06* (2006.01)
*B29L 31/08* (2006.01)
(58) Field of Classification Search
CPC .......... B29L 2031/085; F05B 2240/96; Y02E 10/72; Y02P 70/50; B29K 2995/0097; B29D 99/0028
See application file for complete search history.

(56) References Cited

U.S. PATENT DOCUMENTS

| | | | | |
|---|---|---|---|---|
| 9,132,590 | B2* | 9/2015 | Frydendal | B29C 70/48 |
| 10,024,298 | B2* | 7/2018 | Kratmann | F03D 1/00 |
| 11,015,573 | B2 | 5/2021 | Bech | |
| 11,022,093 | B2 | 6/2021 | Bech | |
| 2009/0304513 | A1* | 12/2009 | Jacobsen | F03D 1/0608 |
| | | | | 416/223 R |
| 2010/0092288 | A1* | 4/2010 | Sorensen | F03D 7/0236 |
| | | | | 416/223 R |
| 2011/0020131 | A1* | 1/2011 | Petersen | B29D 99/0025 |
| | | | | 425/150 |
| 2012/0027618 | A1* | 2/2012 | Zalar | F03D 1/0658 |
| | | | | 416/241 R |
| 2013/0330199 | A1 | 12/2013 | Bagepalli et al. | |
| 2015/0132141 | A1 | 5/2015 | Stege et al. | |
| 2015/0159624 | A1 | 6/2015 | Haahr et al. | |
| 2015/0343718 | A1 | 12/2015 | Madsen et al. | |
| 2016/0003215 | A1* | 1/2016 | Kratmann | F03D 1/00 |
| | | | | 29/889.7 |
| 2016/0123306 | A1* | 5/2016 | Minadeo | F03D 1/0658 |
| | | | | 416/174 |
| 2016/0176127 | A1* | 6/2016 | Borsting | B29C 70/386 |
| | | | | 264/258 |
| 2018/0252200 | A1* | 9/2018 | Murugappan | F03D 1/0658 |
| 2022/0055323 | A1* | 2/2022 | Suselbeek | B29C 70/443 |
| 2022/0186707 | A1* | 6/2022 | Ferfecki | B29C 70/443 |

FOREIGN PATENT DOCUMENTS

| | | | | |
|---|---|---|---|---|
| CN | 110249126 | A | | 9/2019 |
| CN | 110268155 | A | | 9/2019 |
| CN | 116079955 | A * | | 5/2023 |
| EP | 2674614 | A2 | | 12/2013 |
| EP | 2963282 | A1 | | 1/2016 |
| EP | 4116575 | A1 * | 1/2023 | .......... F03D 1/0658 |
| WO | WO-2012111518 | A1 * | 8/2012 | .......... F03D 1/0658 |
| WO | 2013083130 | A1 | | 6/2013 |
| WO | 2016057110 | A1 | | 4/2016 |

OTHER PUBLICATIONS

European Patent Office, Extended European Search Reprot in EP Application No. 19201697.0, Jun. 23, 2020.
European Patent Office, International Search Report and Written Opinion in PCT Application No. PCT/ EP2020/077914, Feb. 17, 2021.
European Patent Office, Examination Report issued in corresponding EP Application No. 20781557.2. dated Oct. 11, 2023.

* cited by examiner

METHOD OF MANUFACTURING A WIND TURBINE BLADE HAVING AN INCLINED ROOT END SURFACE

TECHNICAL FIELD

The present invention relates generally to wind turbine blades, and more specifically to an improved method of manufacturing wind turbine blades.

BACKGROUND

Modern utility-scale wind turbines typically comprise a rotor formed of a plurality of wind turbine blades that are attached to a central hub at their root ends, the hub being coupled to a nacelle at the top of a tower. Wind turbine blades are usually designed to perform well in a wide range of conditions, as wind conditions can vary significantly between different wind turbine sites. Even within the same wind farm, different wind turbines may experience significantly different wind conditions dependent on their location within said wind farm. It follows that there is scope to optimise the design of blades and rotors for individual turbines to improve aerodynamic and structural performance over that of a standard blade.

One way of optimising a rotor for a specific location is to tailor an angle at which the wind turbine blades are oriented relative to the hub. For example, "sweep" and "coning" are known to improve loading on turbine components, regulate turbine power output or to reduce the risk of blades striking the tower in high wind conditions. Rotors having "sweep" comprise blades oriented such that the longitudinal axis of a blade is angled relative to a radial direction of the rotor in the plane of rotation. Conversely, rotors having "coning" comprise blades oriented such that the longitudinal axis of a blade is angled upwind, increasing the distance between tips of the blades and the tower.

To configure a rotor having coning or sweep, a face of the hub to which the root end of a blade is connected may be configured to orient the blades at an angle relative to a radius of the rotor. Tailoring the design of the hub, or machining surfaces of the hub, to provide a site-specific rotor is very expensive and inefficient.

Alternatively, the rotor may comprise a blade connection component connected between the root end of each blade and the hub. The blade connection component comprises a first surface for connection to the hub, and a second surface for connection to the blade which is oriented at an angle relative to the first surface, thereby effecting an angle between the blade and hub when said blade is connected to the hub via the connection component. However, such a solution introduces additional failure modes in the connection between a blade and the hub. Further, connection components are sized according to the diameter of a blade's root end and are therefore large components. Manufacturing individual tailored connection components for site-specific blades is therefore expensive and may require considerable additional tooling.

Modern wind turbine blades are generally manufactured using a blade mould. However, due to their size and complexity, blade moulds can be very expensive, and often take up a considerable amount of floor space in a blade manufacturing facility. For at least these reasons it is unfavourable to produce individual new blade moulds to manufacture each individual wind turbine blade having a site-specific root end configuration.

It is against this background that the present invention has been developed.

SUMMARY OF THE INVENTION

In a first aspect of the invention there is provided a method of manufacturing a wind turbine blade. The method comprises providing a mould for a shell of the wind turbine blade, the mould extending in a longitudinal direction from a root end to a tip end; providing a plurality of elongated root inserts; providing a root plate with a plurality of arcuately arranged connection points; at the connection points, connecting the root inserts to the root plate, such that the connected root inserts jointly form a contour of a portion of a root section of the wind turbine blade; and positioning the root plate relative to the mould in order to place the contour formed by the root inserts at least partially into the mould. The method further comprises providing a spacer having a decreasing thickness, and the connecting of the root inserts to the root plate comprises providing the spacer between the root inserts and the root plate.

Providing the spacer with decreasing thickness between the root inserts and the root plate results in an offset in the longitudinal direction between end surfaces of root inserts of the plurality of root inserts. The end surfaces of the root inserts together form an end surface at a root end of a wind turbine blade formed by the method described above. The longitudinal offset between end surfaces of the root inserts thereby serves to form an end surface of the blade which is inclined at a non-perpendicular angle to a longitudinal axis of the blade. A plurality of such blades having an end surface oriented at a non-perpendicular angle to the longitudinal axis of the blade can be connected to a central hub to provide a rotor having sweep or coning, or a combination or sweep and coning dependent on the orientation of the end surface. Preferably the rotor comprises three wind turbine blades, the end surface of each respective wind turbine blade being equally oriented relative to a longitudinal axis of said blade. A rotor of a different wind turbine in the same wind farm may have a rotor comprising blades with end surfaces oriented at a different angle relative to their longitudinal axes, the rotor thereby having a different degree of sweep and/or coning to the previously described wind turbine.

The spacer may have a continuously decreasing thickness. Arranging a plurality of root inserts with a spacer having a continuously decreasing thickness provides the advantage that the blade formed by the method comprises a smooth end surface inclined at a non-perpendicular angle to the longitudinal axis of the blade. Such a blade comprising a smooth end surface may not require significant further processing steps such as milling to finish the blade, and may provide a surface complimentary to a surface of the hub to which the blade may be connected.

Alternatively, the spacer may have a stepwise decreasing thickness. A stepwise decreasing spacer provides the advantage that the plurality root inserts arranged with the spacer are oriented substantially parallel to the longitudinal direction of the mould, and therefore parallel to the longitudinal axis of a blade formed in said mould. Such a parallel arrangement of root inserts reduces misalignments or gaps between neighbouring root inserts, providing a blade having high rigidity and strength at the root end. Furthermore, a stepwise decreasing spacer was found to be simpler and hence cheaper and faster to manufacture. This is particularly the case when the spacer comprises multiple separate spacer sections each having one fixed thickness.

The spacer may comprise multiple separate spacer sections, each spacer section configured for being provided between the root plate and multiple ones of the plurality of elongated root inserts. Preferably each spacer section may be configured for being provided between the root plate and 5 to 15 elongated root inserts. That is to say, preferably around 5 to 15 elongated root inserts may be associated with each spacer section.

Forming the spacer of multiple spacer sections is advantageous both for transport and handling as the spacer sections are of a relatively small size in comparison to the size of the root end of the blade. Further, being smaller components, the spacer sections may be manufactured to a high dimensional accuracy and/or at a lower cost.

Each spacer section may alternatively be configured for being provided between the root plate and an individual root insert of the plurality of root inserts. However, such a configuration may have drawbacks in terms of assembly time and the number of parts required in comparison to examples wherein each spacer section is configured for being provided between the root plate and multiple ones of the plurality of elongated root inserts.

Each spacer section may have a different and gradually decreasing thickness. Such spacer sections can be arranged to form a spacer having a continuously decreasing thickness. Alternatively, the multiple spacer sections may each have one of at least two different, but substantially constant thicknesses. Such spacer sections each having a substantially constant, but different, thickness can be arranged to form a spacer having a stepwise decreasing thickness.

Positioning the root plate relative to the mould may further comprise positioning the root plate relative to the mould such that the connection points are outside of the mould and spaced apart from the root end of the mould in the longitudinal direction. One or more root inserts of the plurality of root inserts may therefore extend at least partially beyond the root end of the mould in the longitudinal direction. The spacer may be at least partially provided outside of the mould. Alternatively, where the connection points are not outside the mould, the spacer may be provided completely inside the mould.

The root plate may comprise one or more distancing features configured to set a distance between the root end of the mould and the connection points. Such distancing features may comprise protrusions extending from the root plate in the longitudinal direction. Alternatively or in addition, the method may comprise providing one or more tools to set a distance between the root end of the mould and the connection points. The distancing features of the root plate and/or tools provided serve to accurately position the root plate relative to the mould to correctly set a distance between the connection points and the root end of the mould.

The method may further comprise providing a shim plate between the root plate and the root end of the mould. The shim plate is a substantially planar member, and is configured to set a distance offsetting each of the connection points of the root plate from the root end of the mould in the longitudinal direction.

The method may further comprise forming the shell of the wind turbine blade inside the mould, an end surface of the shell being formed by end surfaces of the plurality of root inserts; removing the root plate and the spacer from the end surface of the shell; and smoothening the end surface of the shell. The smoothening may comprise using a milling machine.

Each of the plurality of root inserts may be of substantially the same length. Where the root inserts are of substantially the same length, providing the spacer between the root inserts and the root plate results in an offset in the longitudinal direction between end surfaces of root inserts of the plurality of root inserts such that, when the root plate is positioned relative to the mould, the plurality of elongated root inserts extend to different respective depths into the mould.

In a second aspect of the invention there is provided a wind turbine blade obtainable by the method as described above. Such a wind turbine blade may differ from traditional wind turbine blades by having a build-in sweep and/or coning of the root end. Hence, a blade connection component between the blade root and the hub hence is not required to realize a wind turbine having sweep and/or coning. This may provide a stronger and lighter solution achieve sweep and/or coning of a wind turbine.

In another aspect of the invention there is provided a set of at least two separate spacer sections each having a different thickness, and a plurality of elongated root inserts for a wind turbine blade, each spacer section configured for being provided between arcuately arranged connection points of a root plate and multiple ones of the plurality of elongated root inserts.

At least one of the spacer sections of the set of at least two spacer sections may comprise at least two spacer section plates stacked on top of each other to form said spacer section.

In another aspect there is provided a wind turbine comprising a wind turbine blade produced by the method described above.

Further, there is provided a wind farm comprising at least a first wind turbine and a second wind turbine as defined above, the first wind turbine is having a first sweep angle and a first coning angle, the second wind turbine is having a second sweep angle and a second coning angle, wherein the first sweep angle is different from the second sweep angle and/or the first coning angle is different from the second coning angle. Wind turbines having sweep and/or coning were know prior to this disclosure. However, tailoring of sweep and/or coning for individual wind turbines was not feasible due to lack of a flexible and affordable manufacturing method. The present disclosure finally makes it possible to make an individual customization for sweep and/or coning by adjusting the spacers (shifting along the periphery of the blade root or replacing some of the spacers by thicker or thinner spacers or spacer sections. This enables optimization of the sweep and/or coning for the wind turbines at each the position (or type of position) in a wind farm park to optimized energy production and/or reduced wear or fatigue of the wind turbine.

In yet a further aspect of the invention there is provided a wind farm comprising a first wind turbine and a second wind turbine. The first wind turbine comprises a rotor with a first rotor blade oriented at a first angle relative to a radius of the rotor, wherein the first angle corresponds to the orientation of an end surface of the first blade relative to a longitudinal axis of said blade. The second wind turbine comprises a rotor with a second rotor blade oriented at a second angle relative to a radius of the rotor, wherein the second angle corresponds to the orientation of an end surface of the second blade relative to a longitudinal axis of said blade. The first angle is different from the second angle. The angle relative to the radius of the rotor is a result of the combination of cone and sweep angles and is hence a property of the blade for a specific arrangement of the blade. Comparison of the angle relative to the radius of the rotor for two blades should therefore be made for blades arranged the same way. Pitching of a blade during operation of a wind turbine may change the angle relative to the radius of the rotor observed for that blade, but this is due to a change in the arrangement of the blade, and if comparing two blades with different angles relative to the radius of the rotor in this new arrangement of the blade, then the two blades would also have different angles relative to the radius of the rotor in the new arrangement. Wind turbines having sweep and/or coning (and hence an angle relative to the radius of the rotor) were know prior to this disclosure. However, tailoring of sweep and/or coning for individual wind turbines was not feasible due to lack of a flexible and affordable manufacturing method. The present disclosure finally makes it possible to make an individual customization for sweep and/or coning by adjusting the spacers (shifting along the periphery of the blade root or replacing some of the spacers by thicker or thinner spacers or spacer sections. This enables optimization of the sweep and/or coning for the wind turbines at each the position (or type of position) in a wind farm park to optimized energy production and/or reduced wear or fatigue of the wind turbine.

BRIEF DESCRIPTION OF THE DRAWINGS

Embodiments of the present invention will now be described by way of non-limiting example only, with reference to accompanying figures, in which:

FIG. 1b is an exaggerated schematic view of a root end of a wind turbine blade of the wind turbine in FIG. 1a;

FIG. 2b is an exaggerated schematic view of a root end of a wind turbine blade of the wind turbine in FIG. 2a;

DETAILED DESCRIPTION

Figure 1A:
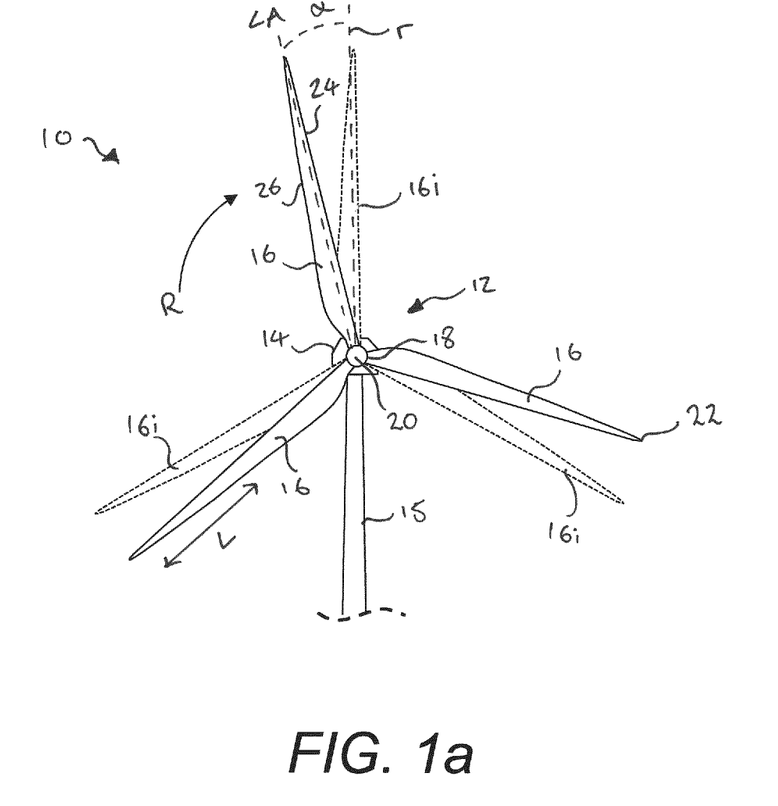
FIG. 1a shows a schematic front view of a wind turbine comprising a rotor having sweep.

FIG. 1a shows a schematic front view of a modern utility scale wind turbine 10. The wind turbine 10 comprises a rotor 12 rotatably mounted to a nacelle 14 which sits atop a tower 15. The rotor 12 is formed of a plurality of wind turbine blades 16 which are connected at their respective root ends to 18 a central hub 20, each blade 16 extending in a longitudinal direction (L) from its root end 18 to a respective blade tip 22. The wind turbine blades 16 each comprise a leading edge 24 and a trailing edge 26, and the rotor 12 rotates in a direction indicated by the arrow R about a rotor axis A (shown in FIG. 2a) extending through the centre of the hub 20 and perpendicularly to the page in FIG. 1a.

The rotor 12 in this example has "sweep", wherein the blades 16 are arranged with the hub 20 such that a longitudinal axis LA of each blade 16 is inclined at an angle α relative to a radius r of the rotor. As a consequence, the longitudinal axes LA of the three blades 16 of the wind turbine 10 do not run through a single point at the centre of the hub 20, as they would do had there been no sweep. For reference, an arrangement of wind turbine blades 16i of a standard rotor not having sweep are indicated in FIG. 1a by the dotted outlines. A rotor 12 having sweep may be implemented at a wind turbine site where strong wind conditions are expected. Angled blades 16 of a rotor 12 having sweep can help to unload the rotor 12 in high wind conditions as the blades 16 bend, reducing the loading of gearbox components and bearings within the nacelle 14 of the turbine 10 for example.

Figure 1B:
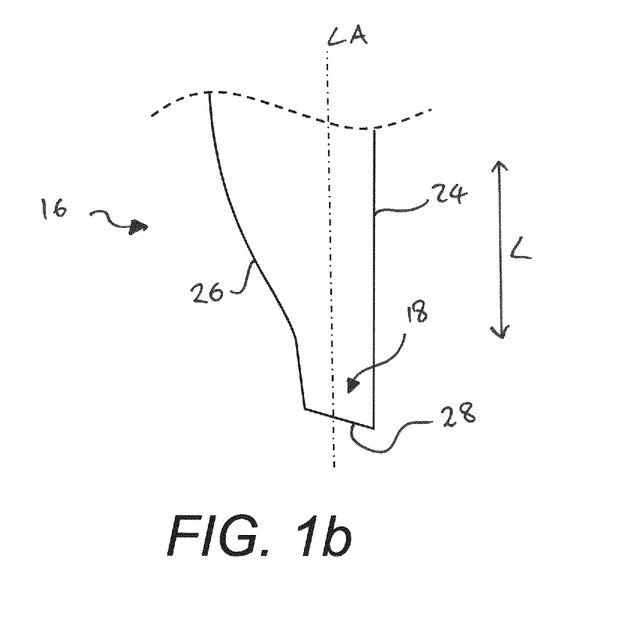

FIG. 1b shows an exaggerated schematic view of the root end 18 of a wind turbine blade 16 of the wind turbine 10 in FIG. 1a. The blade 16 has an end surface 28 at the root end 18 which interfaces with a corresponding surface on the hub 20 when the blade 16 is connected thereto. The end surface 28 is oriented at a non-perpendicular angle to the longitudinal axis LA of the blade 16 to effect the angling of the blade 16 with respect to a radius r of the rotor 12 when the blade 16 is connected to the hub 20. As such, the leading edge 24 extends further in the longitudinal direction L of the blade 16 than the trailing edge 26 at the root end 18.

Typically, a sweep angle α of a wind turbine blade 16 of a rotor 12 having sweep is between 0.1 and 0.5 degrees with respect to a radius r of the rotor 12. Such a sweep angle may for example result in a displacement of the tip end of a blade by up to 1 m, dependent in part on the length of the blade.

Figure 2A:
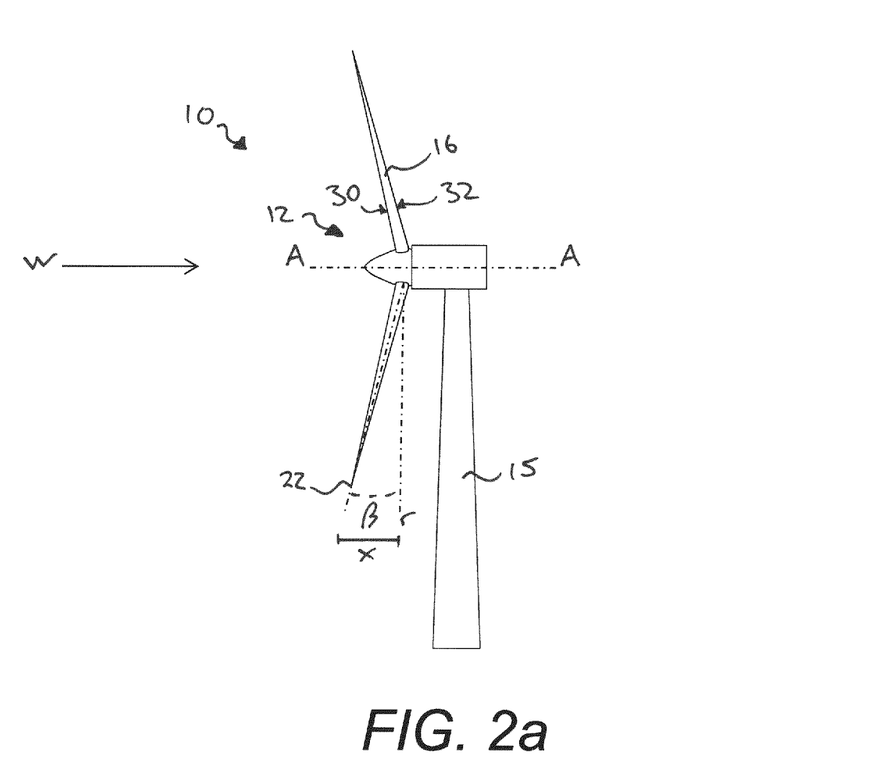
FIG. 2a shows a schematic side view of a wind turbine comprising a rotor having coning.

FIG. 2a is a schematic side view of a further modern utility-scale wind turbine 10. Arrow W indicates the direction of the wind incident on the wind turbine 10. The wind turbine blades 16 comprise a windward side 30 facing the incident wind, and a leeward side 32 on the opposite side of the blade 16. The wind turbine 10 of FIG. 2a is largely identical to that described with reference to FIG. 1a, and similar features will not be described in detail in the interest of conciseness.

The rotor 12 of the turbine 10 in FIG. 2a has coning, wherein the blades 16 are inclined at an angle β relative to a radius r of the rotor 12. The blades 16 are angled upwind such that a distance x between the blade tips 22 and the tower 15 is increased in comparison to a rotor 12 which does not have coning. Typically, the blades 16 of a rotor 12 having coning are angled at between 0.1 and 1 degree relative to a radius r of the rotor 12. Such an angle may in some examples result in an increase in distance x of between 1 m and 2 m greater than a distance x of a typical rotor not having coning. A rotor 12 having coning, such as that shown in FIG. 2a, may be implemented at a wind turbine site prone to high or unpredictable wind conditions where there exists a high risk of wind turbine blades 16 striking the tower 15.

Figure 2B:
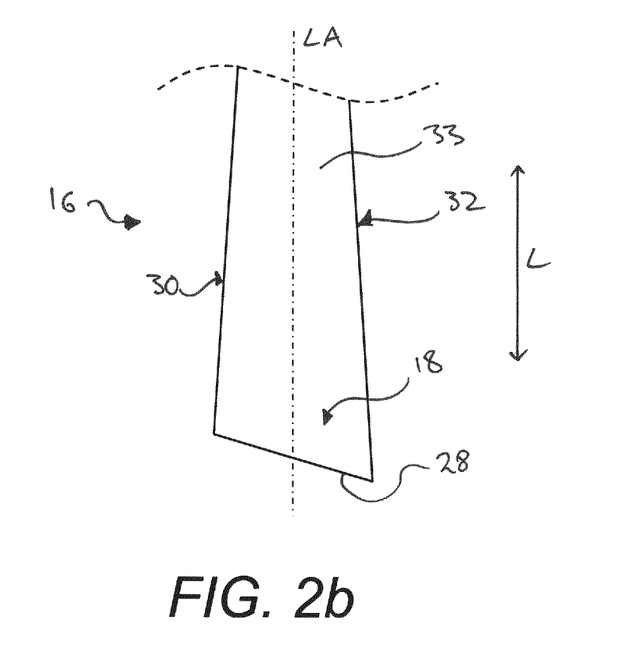

FIG. 2b shows an exaggerated schematic view of the root end 18 of a wind turbine blade 16 of the wind turbine 10 in FIG. 2a. The blade 16 has an end surface 28 at its root end 18 which is inclined relative to the longitudinal axis LA of the blade 16 at a non-perpendicular angle. The end surface 28 is inclined relative to the longitudinal axis LA such that the leeward side 32 of the blade 16 extends beyond the windward side 30 in the longitudinal direction L of the blade 16 at the root end 18. When arranged with a corresponding surface of the central hub 20, the inclined end surface 28 of the blade 16 serves to angle the blade 16 in an upwind direction.

Whilst the blades 16 of FIGS. 1a to 2b have been described as having one of either sweep or coning, it will be appreciated than in many examples, a blade 16 may to a certain extent have both sweep and coning.

In order to optimise the amount of wind energy harvested, a wind farm may comprise wind turbines 10 as shown in FIGS. 1a to 2b which are each configured to best capture energy from incident wind dependent on their specific location in the wind farm and the wind conditions at this location. The wind farm therefore comprises a first wind turbine 10 with a first rotor 12 formed of a plurality of wind turbine blades 16 which are connected to a central hub 20. The rotor blades 16 of the first wind turbine 10 are oriented at a first angle relative to a radius r of the rotor 12. That is to say, a longitudinal axis LA of each blade 16 of the first wind turbine 10 is oriented relative to a radius r of the first rotor 12 at a first sweep angle $\alpha_1$ and a first coning angle $\beta_1$. The orientation of a blade 16 of the first wind turbine 10, i.e. the first angle, corresponds to the orientation of an end surface 28 of the first blade 16 relative to the longitudinal axis LA of said first blade 16.

Further, the wind farm comprises a second wind turbine 10 with a second rotor 12 formed of a plurality of wind turbine blades 16 which are connected to a central hub 20. The rotor blades 16 of the second wind turbine 10 are oriented at a second angle relative to a radius r of the rotor 12. That is to say, a longitudinal axis LA of each blade 16 of the second wind turbine 10 is oriented relative to a radius r of the second rotor 12 at a second sweep angle $\alpha_2$ and a second coning angle $\beta_2$. The orientation of a blade 16 of the second wind turbine 10, i.e. the second angle, corresponds to the orientation of an end surface 28 of the second blade 16 relative to the longitudinal axis LA of said second blade 16.

The first and second angles of the blades 16 of the respective first and second wind turbines 10 in the wind farm are different. The orientation of a blade 16 of the first wind turbine 10 is set to best capture energy from wind at a first location in the wind farm. Similarly the orientation of a blade 16 of the second wind turbine 10 is set to most effectively capture energy from the wind at a second location in the wind farm. The blades 16 of the first and second wind turbines 10 are therefore configured differently, each with a differently oriented end surface 28 in comparison to the end surface of blades of the other wind turbine 10 in the wind farm.

Modern wind turbine blades 16 can exceed 70 m in length and are typically formed of a substantially hollow shell 33 made of composite materials such as glass fibre reinforced plastic (GFRP). In order to manufacture such large composite structures, the shell 33 of a wind turbine blade 16 may be formed of two half shells, each individually formed in a corresponding mould of a blade mould assembly.

An improved method of manufacturing a wind turbine blade 16 having an end surface 28 oriented at a non-perpendicular angle to the longitudinal axis LA of the blade 16, such as those described with reference to FIGS. 1a to 2b, will now be described with reference to the remaining FIGS. 3 to 6.

Figure 3:
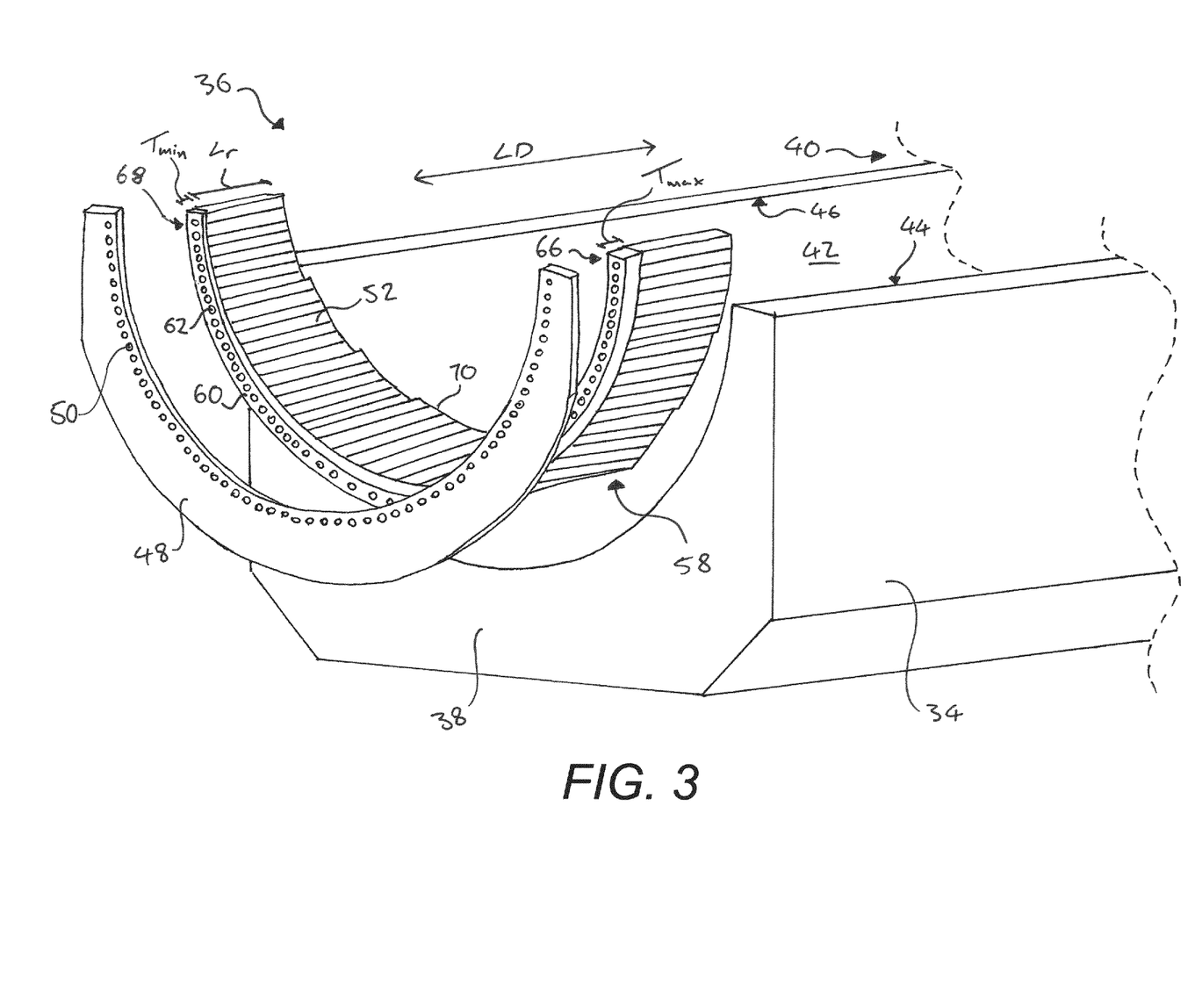
FIG. 3 shows a schematic perspective view of a mould and root plate used to form a shell of a wind turbine blade.

The method comprises providing a mould 34. FIG. 3 shows part of a mould assembly 36 for manufacturing a wind turbine blade 16. The mould assembly 36 in this example is formed of two moulds 34, each mould being configured to form a shell for one of the windward or leeward sides 30, 32 of the blade 16. For clarity only one of the moulds 34 is shown in FIG. 3. It will be appreciated that the other mould of the mould assembly 36 is configured in substantially the same manner as that shown in FIG. 3 and will therefore not be described in further detail.

The mould 34 extends in a longitudinal direction LD from a root end 38 to a tip end 40. The mould 34 comprises a mould surface 42 shaped to form an outer surface of one of the windward or leeward sides 30, 32 of the blade 16. In this example, a first edge 44 of the mould 34 is configured to form the trailing edge 26 of a wind turbine blade shell 33, and a second edge 46 is configured to form the leading edge 24 of a wind turbine blade shell 33.

The method further comprises providing a root plate 48. The root plate 48 comprises a plurality of arcuately arranged connection points 50. In this example the connection points 50 comprise through bores arranged in an arc in the root plate 48. The connection points 50 are configured to enable connection of a plurality of root inserts 52 to the root plate 48.

The root inserts 52 each comprise a means for connecting a finished blade 16 to the hub 20 of a wind turbine 10. In this example, the root inserts 52 comprise a threaded bushing 54 (see FIG. 5), provided to form one side of a compression joint between the wind turbine blade 16 and the hub 20 when mounting a finished blade 16 to the hub 20.

In this example, the root inserts 52 are connected to the root plate 48 by arranging a bolt 56 (see FIG. 5) at a connection point 50 and fastening said bolt 56 with the threaded bushing 54 of a root insert 52. When connected to the root plate 48, the root inserts 52 jointly form a contour 58 of a portion of a root section of the wind turbine blade 16. In this example the contour 58 formed by the plurality of root inserts 52 connected to the root plate 48 corresponds directly to the arcuate arrangement of the connection points 50 of the root plate 48 to form a substantially semi-cylindrical convex surface.

The root plate 48 is positioned relative to the mould 34 in order to place the contour 58 formed by the root inserts 52 at least partially into the mould 34. In some examples one or more root inserts 52 may partly extend beyond the root end 38 of the mould 34 in the longitudinal direction LD. In other examples the root inserts 52 may be so configured that when the root plate 48 is positioned relative to the mould 34, the full length $L_r$ of each of the root inserts 52 is in the mould 34.

According to the invention, a spacer 60 having a decreasing thickness T is provided between the root inserts 52 and the root plate 48 when connecting said root inserts 52 to the root plate 48. The spacer 60 is configured to permit the connection of each root insert 52 to the root plate 48. In this example, the spacer 60 comprises a bore 62 corresponding to each connection point 50 of the root plate 48 such that bolts (not shown) may be arranged through the connection points 50, through bores 62 in the spacer 60, and fastened to the threaded bushings 54 in each of the plurality of root inserts 52. End surfaces 64 (shown in FIG. 5) of each of the root inserts 52 abut the spacer 60.

A decreasing thickness T will be understood to mean that the spacer comprises at least one region (up to two regions in some examples) having a maximum thickness $T_{max}$ and at least one region having a minimum thickness $T_{min}$, wherein the thickness T is a dimension of the spacer 60 measured in the longitudinal direction LD of the mould 34 when the root plate 48 is positioned relative to the mould 34. It will be understood that whilst the thickness is described herein as decreasing from a maximum thickness $T_{max}$ to a minimum thickness $T_{min}$, the same thickness T can be described as an increasing thickness T, increasing from a minimum thickness $T_{min}$ to a maximum thickness $T_{max}$ without departing from the scope of the invention.

In this example, the thickness T of the spacer 60 is greater at a first end 66 of the spacer 60 than at a second end 68 of the spacer 60. As a result of the decreasing thickness T of the spacer 60, the end surfaces 64 of the root inserts 52 are offset from the end surfaces 64 of other root inserts 52 in the longitudinal direction LD of the blade mould 34. In this example, the end surface 64 of a root insert 52 arranged with the spacer 60 in proximity to the first end 66 is situated nearer the tip end 40 of the mould 34 in the longitudinal direction LD than an end surface 64 of a root insert 52 arranged with the spacer 60 in proximity to the second end 68 thereof when the root plate 48 is positioned relative to the mould 34. In other examples, dependent on the profile of the thickness T of the spacer 60, an end surface 64 of a root insert arranged between with the spacer 60 between the first and second ends 66, 68 may be situated nearest the tip end 40 of the mould 34 in the longitudinal direction LD.

In some examples, the length $L_r$ of each of the root inserts 52 may vary. However, in this example, each of the plurality of root inserts 52 is of substantially the same length. The decreasing thickness T of the spacer 60 therefore results in a longitudinal offset between the plurality of root inserts 52 such that, when the root plate 48 is positioned relative to the mould 34, the plurality of elongated root inserts 52 extend to different respective depths into the mould 34. In examples where the root inserts 52 are all of substantially the same length $L_r$, the decreasing thickness T of the spacer 60 therefore also results in a longitudinal offset between tip ends 70 of the plurality of root inserts 52 corresponding to the decreasing thickness T of the spacer 60. This may be advantageous in some examples as the root inserts 52 provide structural rigidity to the root end 18 of the blade 16, and by increasing the depth to which some of the inserts 52 extend into the mould 34, the blade 16 formed in the mould 34 comprises increased rigidity extending further along the blade 16 at the root end 18 on one side of the blade 16.

The spacer 60 comprises one of a stepwise decreasing thickness T, as shown in FIG. 3, or a continuously decreasing thickness T. A 'stepwise decreasing thickness T' is defined as a thickness T which decreases in discrete, discontinuous steps. In such a situation, a surface 72 (shown in FIG. 5) of the spacer 60 against which the end surface 64 of a root insert 52 is abutted, can be substantially perpendicular to the thickness T of the spacer 60. Conversely, a 'continuously decreasing thickness T' is defined as a thickness T which decreases gradually and smoothly from a maximum thickness $T_{max}$ to a minimum thickness $T_{min}$.

Figure 4A:
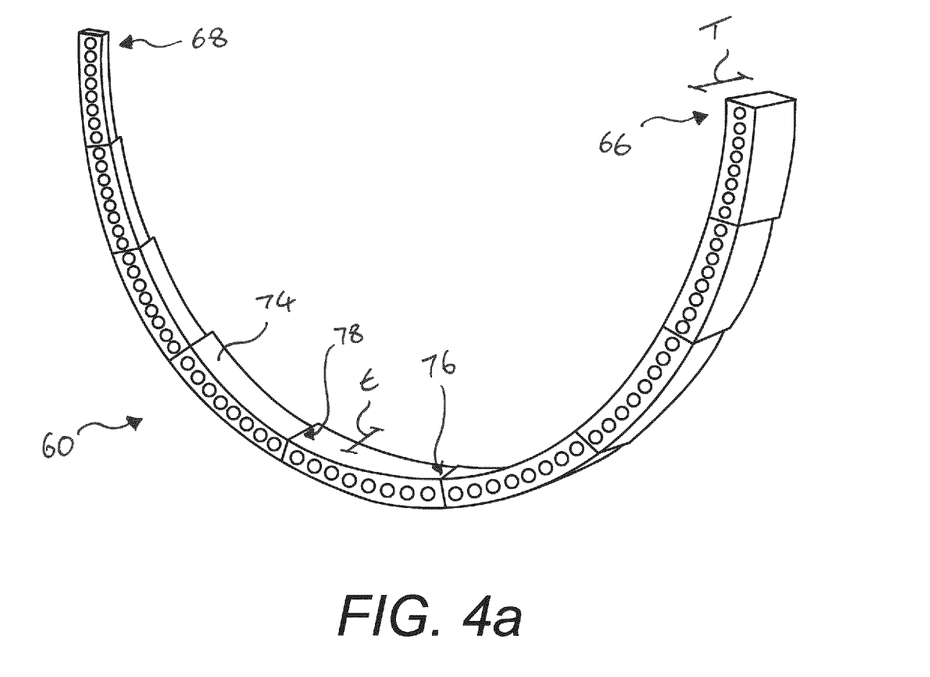
FIG. 4a shows a spacer having a stepwise decreasing thickness for use in manufacturing a wind turbine blade.
Figure 4B:
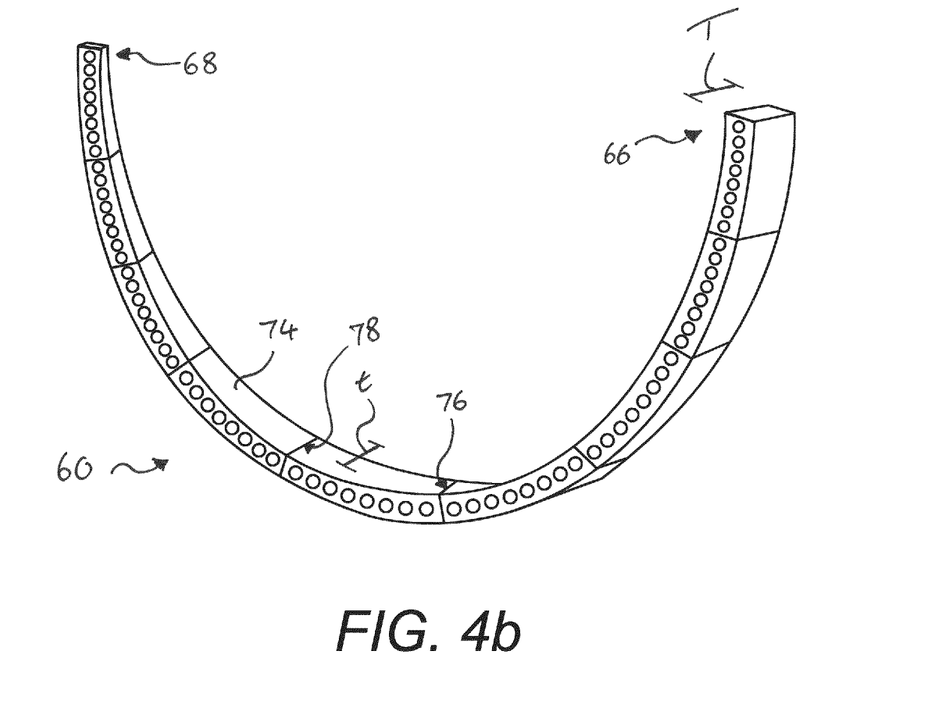
FIG. 4b shows a spacer having a continuously decreasing thickness for use in manufacturing a wind turbine blade.

In this example, the spacer 60 is formed of multiple separate spacer sections 74 which, when arranged together, form a spacer 60 as shown in FIG. 3. FIGS. 4a and 4b respectively show spacer sections 74 forming a spacer 60 having a stepwise decreasing thickness T, and spacer sections 74 forming a spacer 60 having a continuously decreasing thickness T. Each spacer section 74 is configured for being provided between the root plate 48 and multiple ones of the plurality of elongated root inserts 52.

In some examples, each spacer section 74 may be configured for being provided between the root plate 48 and one individual root insert 52 of the plurality of root inserts 52. However, in such an example the time required to manufacture a blade 16 is significantly increased as there may be in excess of eighty individual root inserts 52 to connect to the root plate 48, and so arranging these with in excess of eighty spacer sections 74 may prove inefficient. Preferably each spacer section 74 is configured such that it may be provided between the root plate 48 and about five to fifteen elongated root inserts 52.

The spacer sections 74 shown in FIG. 4a form a spacer 60 having a stepwise decreasing thickness T. In this example each of the spacer sections 74 have one of at least two different, but substantially constant thicknesses t. Each individual spacer section 74 therefore comprises a substantially constant thickness t throughout, from a first end 76 of the spacer section 74 to a second end 78 thereof. Although the spacer 60 shown in FIG. 4a comprises spacer sections having one of nine different thicknesses t, it will be understood that a spacer 60 having a stepwise decreasing thickness T may comprise spacer sections 74 having any of two or more different thicknesses t, and one or more of the spacer sections 74 may have the same thickness t as one or more other spacer section 74.

In this example, the spacer sections 74 are arranged such that the thickness T of the spacer 60 as a whole decreases from the first end 66 to the second end 68. Each of the spacer sections 74 forming the spacer 60 therefore comprises a different thickness t. In this example, a spacer section 74 having the greatest thickness t is arranged to form the first end 66 of the spacer 60, and a spacer section 74 having the smallest thickness t is arranged to form the second end 68 of the spacer 60. Spacer sections 74 arranged between the first and second ends 66, 68 of the spacer 60 each respectively comprise a decreased thickness t in relation to a neighbouring spacer section 74 arranged closer to the first end 66 of the spacer 60, such that the thickness T of the spacer 60 as a whole decreases from the first end 66 to the second end 68.

In other examples, each of the spacer sections 74 may merely have one of at least two different thicknesses t, provided an arrangement of said spacer sections 74 results in a spacer 60 having a decreasing thickness T.

A spacer 60 having a stepwise decreasing thickness T is advantageous as root inserts 52 arranged with such a spacer 60 are arranged such that a longitudinal axis of each root insert 52 can be substantially parallel to the longitudinal direction LD of the mould 34. Each of the root inserts 52 is therefore also substantially parallel to the other root inserts 52 of the plurality of root inserts 52 connected to the root plate 48, as shown in FIG. 3. Gaps between neighbouring root inserts 52 are thereby minimized and the contour 58 formed by the plurality of root inserts 52 connected to the root plate 48 comprises a relatively smooth convex surface. A blade 16 comprising such an arrangement of parallel root inserts 52 at the root end 18 has high structural strength and rigidity. Such uniformity in the orientation of the root inserts 52 also minimizes the risk of manufacturing defects such as misalignments or clashes between neighbouring root inserts 52. Furthermore, spacer sections 74 having a uniform thickness t can be manufactured at a reasonably low cost.

The spacer sections 74 shown in FIG. 4b are arranged to form a spacer 60 having a continuously decreasing thickness T from the first end 66 of the spacer 60 to the second end 68. In this example each spacer section 74 has a different and gradually decreasing thickness t. The thickness t of each separate spacer section 74 decreases from a first end 76 of the spacer section 74 to a second end 78 of the spacer section 74. That is to say for each spacer section 74 in the example shown in FIG. 4b, the thickness t decreases continuously from the first end 76 to the second end 78 thereof. Further, in this example an average (mean) thickness t of each separate spacer section 74 is different to an average (mean) thickness t of other spacer sections 74 forming the spacer 60.

Using a spacer 60 having a continuously decreasing thickness T to manufacture a blade shell 33 can result in said blade shell 33 having a smoother end surface 28 in comparison to a blade shell 33 manufactured using a spacer 60 having a stepwise decreasing thickness T. A shell 33 having a smoother end surface 28 may provide a surface complimentary to a surface of the hub 20 to which the blade 16 is to be connected, thereby providing a better connection between blade 16 and hub 20.

In some examples the spacer 60 may be a single part comprising a decreasing thickness T which is one of a stepwise or continuously decreasing thickness T. Such a spacer 60 may in some examples exceed 3 m in diameter, dependent on the root diameter of the blade 16 being manufactured. Preferably the spacer 60 is formed of multiple separate spacer sections 74 as shown in FIGS. 4*a* and 4*b*. A spacer 60 formed of multiple separate spacer sections 74 may have a higher dimensional accuracy, as the separate spacer sections 74 are relatively small components in comparison to the root diameter of a wind turbine blade 16, and so they can be manufactured to a much higher tolerance. Further, ease of transport and handling are greatly increased for a set of spacer sections 74 in comparison to a single-piece spacer.

In each of the examples described above with reference to FIGS. 3 to 4*a*, the spacer 60 comprises a thickness T which decreases from the first end 66 of the spacer 60 to the second end 68 of the spacer 60. Such a spacer 60 may be used with the mould assembly 36 as described above with reference to FIG. 3 where the first edge 44 of the mould 34 is configured to form a trailing edge 26 of the blade 16. Arranging the spacer 60 such that the first end 66 of the spacer 60 is in proximity to the first edge 44 of the mould 34 when manufacturing the shell 33 of a wind turbine blade 16 results in a shell 33 having a leading edge 24 which extends beyond the trailing edge 26 in the longitudinal direction L of the blade 16. The above described method and apparatus may therefore be used to manufacture the shell 33 of a blade 16 for a rotor 12 having sweep.

It is also anticipated that the spacer 60 may comprise a decreasing thickness T wherein the maximum thickness $T_{max}$ and/or minimum thickness $T_{min}$ are not located at the first and second ends 66, 68 of the spacer 60. That is to say, in some examples the spacer 60 may comprise a maximum thickness $T_{max}$ at a point on the spacer 60 between the first and second ends 66, 68 thereof. The thickness T of such a spacer 60 decreases from said point of maximum thickness $T_{max}$ to a minimum thickness $T_{min}$ towards the first and second ends 66, 68 of the spacer 60. Similarly, a spacer 60 may comprise a minimum thickness $T_{min}$ at a point between the first and second ends 66, 68 of the spacer 60, the thickness T of the spacer 60 decreasing from each of the first and second ends 66, 68 to said point of minimum thickness $T_{min}$ between the first and second ends 66, 68.

A spacer 60 having a maximum or minimum thickness $T_{max}$, $T_{min}$ at a point on the spacer 60 between the first and second ends 66, 68 may be used in a mould assembly 36 such as that shown in FIG. 3, configured to form one of the windward or leeward sides 30, 32 of a wind turbine blade 16, to form a blade 16 for a rotor 12 having coning, or a combination of sweep and coning. For example, to form a blade 16 for a rotor 12 having coning, a spacer 60 comprising a maximum thickness $T_{max}$ at a mid-point on the spacer 60 between the first and second ends 66, 68 may be used with a mould 34 configured to form the leeward side 32 of the blade 16. A spacer having a minimum thickness at a mid-point on the spacer between the first and second ends thereof may be used with a corresponding mould configured to form the windward side 30 of the blade. The resultant blade shell 33 in such an example comprises an end surface 28 inclined relative to the longitudinal axis LA such that the leeward side 32 of the blade 16 extends beyond the windward side 30 in the longitudinal direction LD at the root end 18.

Using multiple separate spacer sections 74 to form the spacer 60 is further advantageous as a number of wind turbine blades 16 having differently oriented end surfaces 28 at their respective root ends 18 may be manufactured using the same mould assembly 36 and set of spacer sections 74. A number of different blade shells 33, with differently oriented end surfaces 28 may be formed using the same mould 34 and set of spacer sections 74 simply by changing the order in which the spacer sections 74 are arranged. For example, rather than arranging the spacer section 74 having the greatest thickness t to form the first end 66 of the spacer 60, said thickest spacer section 74 may be arranged at a point between the first and second ends 66, 68 with spacer sections 74 either side thereof having a lesser thickness t to form a spacer 60 having a decreasing thickness T. Various different configurations of spacer 60 are therefore possible using a single set of spacer sections 74, without any requirement to produce new tools for various different blade root designs.

To form a spacer 60 having a continuously decreasing thickness T, comprising a maximum or minimum thickness $T_{max}$, $T_{min}$ at a point on the spacer 60 between the first and second ends 66, 68, the set of spacer sections 74 may include an additional spacer section not previously described. The spacer section 74 forming said maximum thickness $T_{max}$ may comprise a decreasing thickness t which decreases continuously from a maximum thickness between the first and second ends 76, 78 of the spacer section 74. Similarly, where the spacer 60 comprises a minimum thickness between the first and second ends 66, 68, a spacer section 74 forming said minimum thickness may comprise a decreasing thickness t which decreases from the first and second ends 76, 78 of the spacer section 74 to a minimum thickness at a point between the first and second ends 76, 78.

In some examples wherein the spacer is formed of multiple separate spacer sections 74, one or more of the spacer sections 74 may in turn comprise two or more spacer section plates (not shown). Such spacer section plates may be stacked in the longitudinal direction LD of the mould 34 to form a spacer section 74. The spacer section plates are arranged to form one or more spacer sections 74 such that a cumulative thickness T of the spacer 60 decreases between two regions of the spacer 60 in order to form a spacer 60 having the required decreasing thickness T. In particular, a spacer section 74 having a constant thickness t, such as those described with reference to FIG. 4*a*, may be formed by stacking two or more spacer section plates. The spacer section plates may be stacked to form spacer sections 74 in one or more regions of the spacer 60. It is also anticipated that in some examples, spacer sections 74 having a decreasing thickness t, such as those shown in the example of FIG. 4*b*, may be formed of two or more spacer section plates stacked in the longitudinal direction LD of the mould 34. In some examples the spacer 60 having a decreasing thickness T is therefore formed of spacer sections 74 which may in turn be formed of spacer section plates (not shown).

Whilst throughout the examples described above the spacer 60 has been configured to form a blade 16 having an end surface 28 inclined relative to the longitudinal axis LA of the blade 16, to form a blade shell 33 for a rotor 12 having sweep or coning, it is expressly anticipated that in other examples the spacer 60 may be so configured to produce a blade shell 33 of a blade 16 for a rotor 12 having a degree of both sweep and coning. Taking the mould assembly 36 of FIG. 3 for example, wherein the mould 34 is configured to form a shell 33 for one of the windward or leeward sides 30, 32 of the blade 16, a blade shell 33 for a rotor 12 having both sweep and coning may be manufactured using a spacer 60 comprising a region of greatest thickness $T_{max}$ between a central point of the spacer and one of the first or second ends 66, 68 of the spacer 60.

Figure 5:
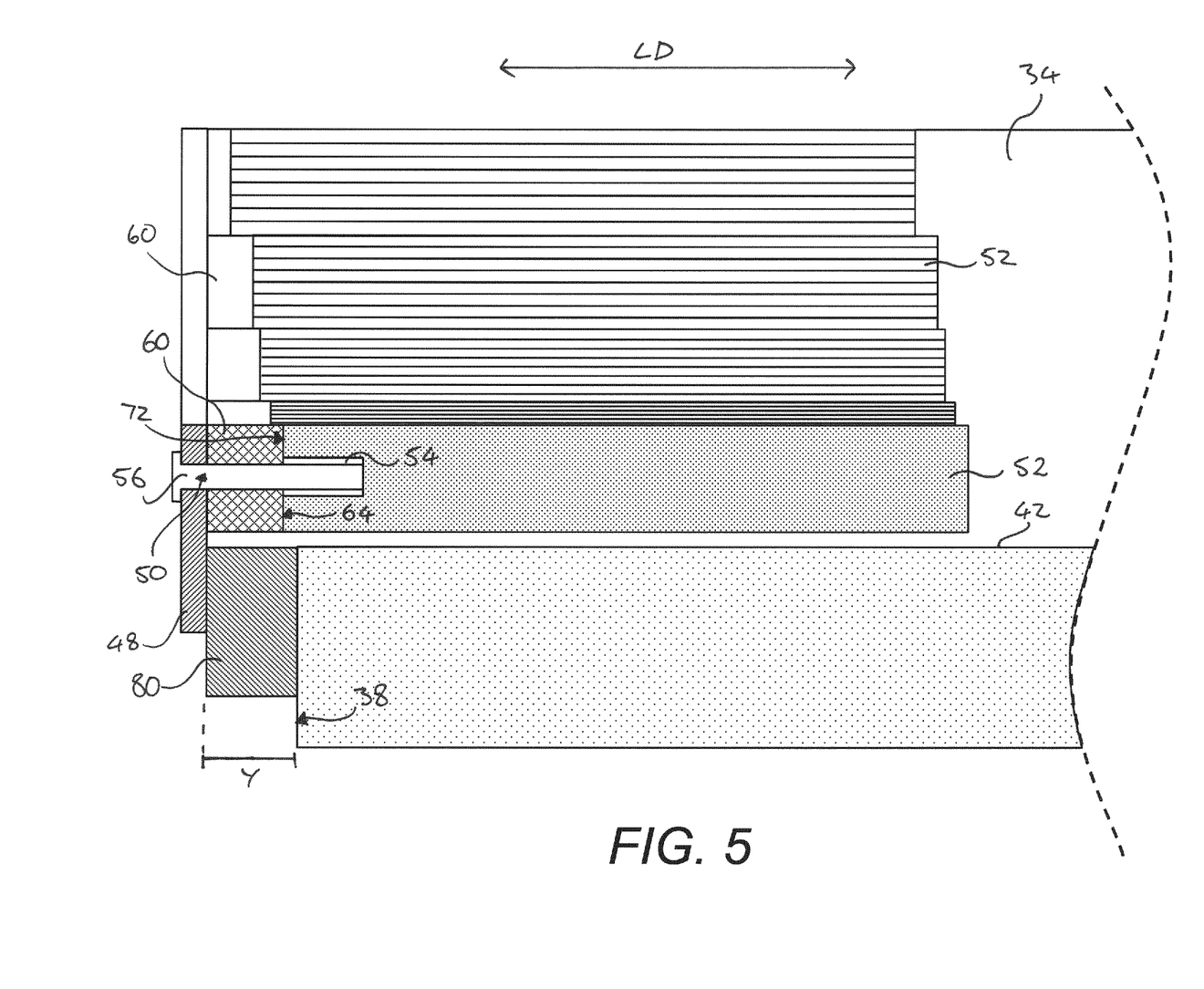
FIG. 5 is a schematic cross sectional view of the mould and root plate during manufacture of a wind turbine blade.

FIG. 5 shows a schematic cross-sectional view in a direction transverse to the longitudinal direction LD of a mould 34 and root plate 48 following positioning of the root plate 48 relative to the mould 34. In some examples of the method, the connection points 50 of the root plate 48 are offset from the root end 38 of the mould 34 in the longitudinal direction LD. Positioning the root plate 48 may therefore further comprise positioning the root plate 48 relative to the mould 34 such that the connection points 50 are outside of the mould 34 and spaced apart from the root end 38 of the mould 34 in the longitudinal direction LD.

It follows that in some examples, the spacer 60 provided between the root plate 48 and the root inserts 52, may be provided at least partially outside the mould 34. Dependent on the selection of spacer thickness T, one or more root inserts 52 of the plurality of root inserts 52 may extend beyond the root end 38 of the mould 34 as a result of the longitudinal offset between the connection points 50 and the root end 38 of the mould 34.

In order to accurately position the root plate 48 relative to the mould 34 such that the connection points 50 are offset from the root end 38 of the mould 34, the root plate 48 may comprise one or more distancing features configured to set a distance y between the connection points 50 and the root end 38 of the mould 34. Such distancing features may comprise protrusions which extend from the root plate 48 in the longitudinal direction LD.

Alternatively or additionally, one or more separate tools may be provided to set the distance y between the connection points 50 of the root plate and root end 38 of the mould 34. One example of such a tool is a shim plate 80. Therefore, in this example the method further comprises providing a shim plate 80 between the root plate 48 and the root end 38 of the mould 34. In this example the shim plate 80 is a substantially planar component, extending across the width of the root end 38 of the mould 34. The shim plate 80 may alternatively consist of multiple individual shim plate sections.

To form the shell 33 of a wind turbine blade inside the mould 34, the method further comprises arranging one or more layers of material which form the composite shell 33 (not shown) on the mould surface 42. The root inserts 52, connected to the root plate 48, are arranged in the mould 34 on top of the one or more layers of composite material by the root plate 48 being positioned relative to the mould 34. Further layers of material (not shown) may be arranged in the mould 34 on top of the root inserts 52 and initial layers of material. The composite shell 33 may then be formed by implementing a forming technique such as Vacuum Assisted Resin Transfer Moulding (VARTM) for example.

Following forming of the shell 33, the method further comprises removing the root plate 48 and the spacer 60 from the end surface 28 of the shell 33. A second shell, formed in a mould configured to form the other of the windward or leeward side 30, 32 of a wind turbine blade 16, is arranged with the composite shell 33 described above. The shells are bonded together to form a complete outer shell of the wind turbine blade 16.

Figure 6:
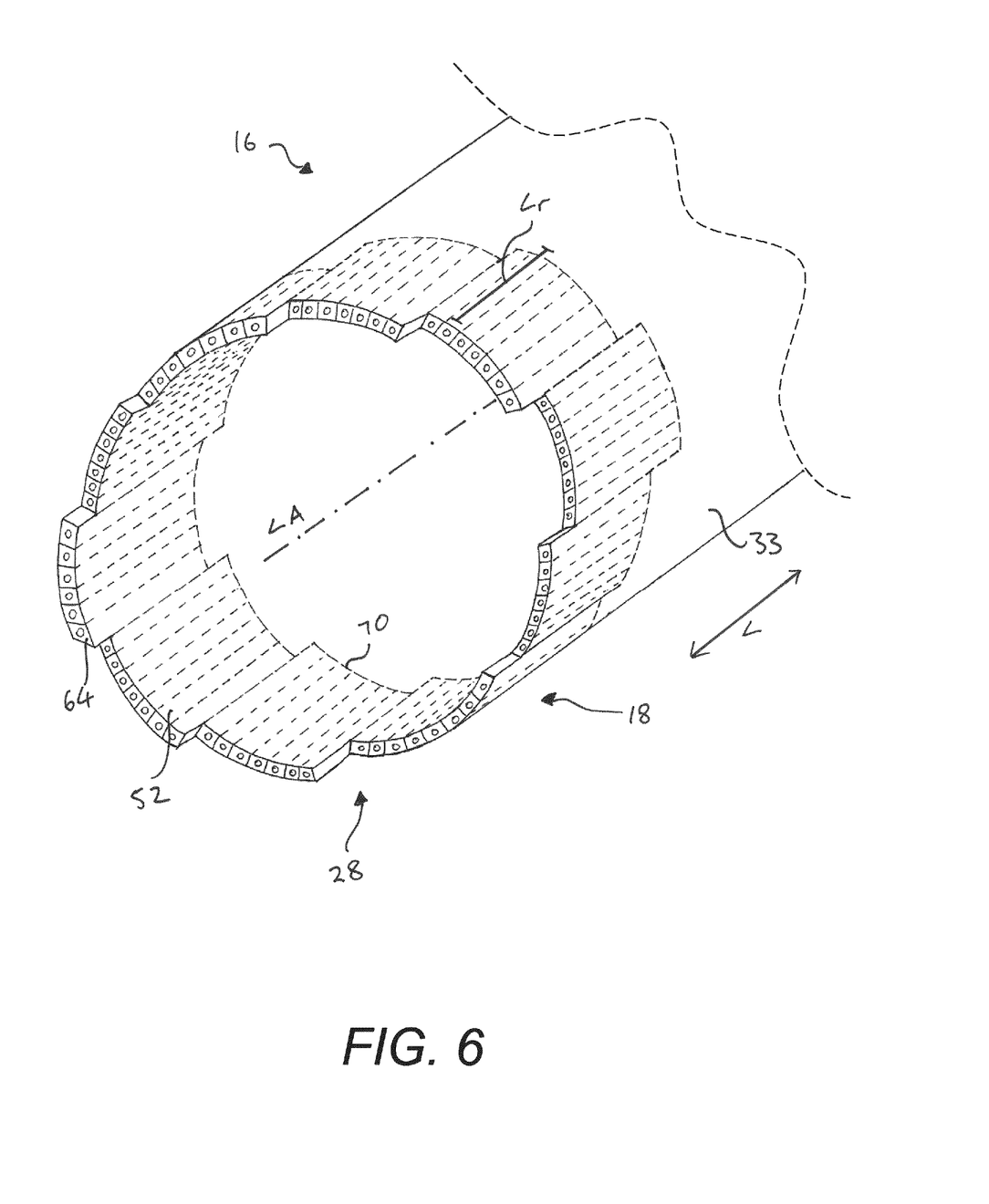
FIG. 6 is an exaggerated schematic perspective view of a root end of a wind turbine blade comprising an end surface oriented at a non-perpendicular angle to a longitudinal axis of the blade.

FIG. 6 shows a schematic perspective view of the root end 18 of the blade 16. The end surface 28 of the shell 33, inclined relative to the longitudinal axis LA of the blade 16, is formed by the end surfaces 64 of the plurality of root inserts 52. Root inserts 52 of the shell 33 are shown in dashed lines on FIG. 6. In this example a spacer 60 comprising a stepwise decreasing thickness T was provided between the root inserts 52 and the root plate 48 when manufacturing the blade 16, as evidenced by the stepped end surface 28 of the shell 33. Further, as the root inserts 52 are each of the same length L r, tip ends 70 of the root inserts 52 are also offset from tip ends 70 of other root inserts 52 in the shell 33.

Optionally, after forming the shell 33 in the mould 34, the end surface 28 of the shell 33 may be smoothened. Smoothening the end surface 28 of the shell 33 may be achieved for example by using a milling machine (not shown). The milling machine is oriented such that a cutting plane is inclined relative to the longitudinal axis LA. This may for example be achieved by aligning reference or mounting points of the milling machine with a plurality of root inserts 52 in the blade shell 33 which are offset from one another in the longitudinal direction L of the blade 16. The end surface 28 is therefore smoothened to provide a surface complimentary to a surface of the hub 20 to which the blade 16 may be connected, in order to provide a constructive interface at the joint between blade 16 and hub 20.

Many alternatives to the method described above are anticipated without departing from the scope of the invention as defined by the claims.

In some examples, the configuration and arrangement of the connection points 50 may be different to that described above. For example, the connection points 50 may comprise a protrusion, recess or other means to locate a plurality of root inserts 52 relative to the root plate 48.

Further, the root inserts 52 may each comprise an embedded bolt or other threaded protrusion instead of the threaded bushing 54 as described with reference to FIG. 3. Connecting a root insert 52 of the plurality of root inserts 52 to the root plate 48 may therefore comprise arranging the embedded bolt of the root insert 52 with a connection point 50, and fastening a nut to the bolt to form a compression joint connecting the root insert 52 to the root plate 48.

In some examples the root plate 48 may comprise the shim plate 80, i.e. the shim plate 80 may be formed integrally with the root plate 48.

The mould 34 may be configured to form one of a leading edge shell or a trailing edge shell of a wind turbine blade 16. Alternatively the blade 16 may be manufactured using a mould assembly comprising more than two moulds, wherein each mould is configured to form a portion of the wind turbine blade shell 33.

It will be appreciated that features from each of the examples described throughout may be readily combined with features described with reference to the other examples described without departing from the scope of the invention as defined in the appended claims.

The invention claimed is:

1. A method of manufacturing a wind turbine blade, the method comprising:
   providing a mould for a shell of the wind turbine blade, the mould extending in a longitudinal direction from a root end to a tip end;
   providing a plurality of elongated root inserts;
   providing a root plate with a plurality of arcuately arranged connection points;
   at the connection points, connecting the root inserts to the root plate, such that the connected root inserts jointly form a contour of a portion of a root section of the wind turbine blade; and
   positioning the root plate relative to the mould in order to place the contour formed by the root inserts at least partially into the mould, wherein the method further comprises
providing a spacer having a decreasing thickness, and wherein
the connecting of the root inserts to the root plate comprises providing the spacer between the root inserts and the root plate.

2. The method of manufacturing a wind turbine blade according to claim 1, wherein the spacer has a continuously decreasing thickness.

3. The method of manufacturing a wind turbine blade according to claim 1, wherein the spacer has a stepwise decreasing thickness.

4. The method of manufacturing a wind turbine blade according to claim 1, wherein the spacer comprises multiple separate spacer sections, each spacer section configured for being provided between the root plate and multiple ones of the plurality of elongated root inserts.

5. The method of manufacturing a wind turbine blade according to claim 4, wherein each spacer section has a different and gradually decreasing thickness.

6. The method of manufacturing a wind turbine blade according to claim 4, wherein the multiple spacer sections each have one of at least two different, but substantially constant thicknesses.

7. The method of manufacturing a wind turbine blade according to claim 1, wherein positioning the root plate relative to the mould further comprises
positioning the root plate relative to the mould such that the connection points are outside of the mould and spaced apart from the root end of the mould in the longitudinal direction, wherein the spacer is at least partially provided outside of the mould.

8. The method of manufacturing a wind turbine blade according to claim 7, the method further comprising providing a shim plate between the root plate and the root end of the mould.

9. The method of manufacturing a wind turbine blade according to claim 1, the method further comprising
forming the shell of the wind turbine blade inside the mould, an end surface of the shell being formed by end surfaces of the plurality of root inserts;
removing the root plate and the spacer from the end surface of the shell; and
smoothening the end surface of the shell.

10. The method of manufacturing a wind turbine blade according to claim 9, wherein the smoothening comprises using a milling machine.

11. The method of manufacturing a wind turbine blade according to claim 1, wherein each of the plurality of root inserts is of substantially the same length.

12. A wind turbine blade obtainable by the method of claim 1.

* * * * *